(12) United States Patent
Shivamurthy et al.

(10) Patent No.: US 11,573,546 B2
(45) Date of Patent: Feb. 7, 2023

(54) REMOTE DISCOVERY OF BUILDING MANAGEMENT SYSTEM METADATA

(71) Applicant: Honeywell International Inc., Morris Plains, NJ (US)

(72) Inventors: Vidya Shivamurthy, Bangalore (IN); Navyatha V, Bangaluru (IN); Hanuma Rajendra Kamath, Bangalore (IN); Aaron D'Souza, Bangalore (IN); Sakthi Vinayagan, Bangalore (IN)

(73) Assignee: HONEYWELL INTERNATIONAL INC., Charlotte, NC (US)

( * ) Notice: Subject to any disclaimer, the term of this patent is extended or adjusted under 35 U.S.C. 154(b) by 129 days.

(21) Appl. No.: 16/888,626

(22) Filed: May 29, 2020

(65) Prior Publication Data

US 2021/0373516 A1  Dec. 2, 2021

(51) Int. Cl.
*G05B 19/042* (2006.01)
(52) U.S. Cl.
CPC .. *G05B 19/042* (2013.01); *G05B 2219/25011* (2013.01); *G05B 2219/2614* (2013.01)
(58) Field of Classification Search
CPC .......... G05B 19/042; G05B 2219/2614; G05B 2219/25011; G05B 15/02; H04L 12/2803; H04L 12/2818; H04L 67/12; H04L 67/28; H04L 67/2823; H04L 12/28
See application file for complete search history.

(56) References Cited

U.S. PATENT DOCUMENTS

| 7,240,106 B2 | 7/2007 | Cochran et al. |
| 8,290,627 B2 | 10/2012 | Richards et al. |
| 9,128,472 B2 | 9/2015 | Lawson et al. |

(Continued)

FOREIGN PATENT DOCUMENTS

| CA | 2900767 A1 | 8/2014 |
| CN | 103679304 A | 3/2014 |

(Continued)

OTHER PUBLICATIONS

Balaji, Bharathan, et al. "Brick: Towards a unified metadata schema for buildings." Proceedings of the 3rd ACM International Conference on Systems for Energy-Efficient Built Environments. 2016. (Year: 2016).*

(Continued)

*Primary Examiner* — Michael D Masinick
(74) *Attorney, Agent, or Firm* — Seager, Tufte & Wickhem, LLP

(57) ABSTRACT

A method of remotely obtaining metadata from a building management system at a building site includes utilizing an intelligent gateway that is disposed at the building site and that is operably coupled with the building management system. A request for the intelligent gateway to obtain metadata from the building management system is received at the intelligent gateway, which applies the metadata request to individual components of the building management system. The intelligent gateway receives the requested metadata from the individual components of the building management system and translates the received metadata into a predetermined format. The intelligent gateway communicates the translated metadata to the remote server.

18 Claims, 5 Drawing Sheets

(56) References Cited

U.S. PATENT DOCUMENTS

| | | |
|---|---|---|
| 9,253,054 B2 | 2/2016 | Maturana et al. |
| 9,363,336 B2 | 6/2016 | Lawson et al. |
| 9,413,852 B2 | 8/2016 | Lawson et al. |
| 9,477,936 B2 | 10/2016 | Lawson et al. |
| 9,535,411 B2 | 1/2017 | Wei et al. |
| 9,565,275 B2 | 2/2017 | Lawson et al. |
| 9,568,908 B2 | 2/2017 | Lawson et al. |
| 9,568,909 B2 | 2/2017 | Lawson et al. |
| 9,965,562 B2 | 5/2018 | Lawson et al. |
| 10,095,207 B2 | 10/2018 | Ji et al. |
| 10,116,532 B2 | 10/2018 | Lawson et al. |
| 10,139,811 B2 | 11/2018 | Lawson et al. |
| 10,401,810 B2 | 9/2019 | Guthrie et al. |
| 10,443,357 B2 | 10/2019 | Weatherhead et al. |
| 2013/0211870 A1 | 8/2013 | Lawson et al. |
| 2013/0212214 A1 | 8/2013 | Lawson et al. |
| 2014/0012950 A1 | 1/2014 | Doucette et al. |
| 2014/0047107 A1* | 2/2014 | Maturana ............ G05B 19/056 709/224 |
| 2017/0212487 A1* | 7/2017 | Gupta ...................... F24F 11/62 |
| 2017/0223110 A1 | 8/2017 | Lawson et al. |
| 2018/0119975 A1* | 5/2018 | Park ...................... G06F 21/602 |
| 2018/0309818 A1* | 10/2018 | Park ........................ H04L 43/08 |
| 2018/0328612 A1* | 11/2018 | Sinha .................. H04L 63/0428 |
| 2019/0014180 A1 | 1/2019 | Lawson et al. |
| 2019/0353378 A1* | 11/2019 | Ramamurti ............. F24F 11/30 |
| 2020/0003028 A1 | 1/2020 | Weatherhead et al. |
| 2020/0133978 A1* | 4/2020 | Ramamurti ............... G06F 8/38 |
| 2020/0142365 A1* | 5/2020 | Sharma .................. G05B 15/02 |
| 2020/0167148 A1* | 5/2020 | Park ..................... G05B 19/042 |
| 2021/0216053 A1* | 7/2021 | Boelk .................... G05B 15/02 |

FOREIGN PATENT DOCUMENTS

| | | |
|---|---|---|
| CN | 104969133 A | 10/2015 |
| EP | 2660667 A2 | 6/2013 |
| EP | 2954377 A1 | 12/2015 |
| MX | 343533 B | 11/2016 |
| WO | 2013133967 A1 | 9/2013 |
| WO | 2014124353 A1 | 8/2014 |
| WO | 2017213771 A1 | 12/2017 |
| WO | 2018234741 A1 | 12/2018 |

OTHER PUBLICATIONS

Fierro, Gabe, et al. "Beyond a house of sticks: Formalizing metadata tags with brick." Proceedings of the 6th ACM international conference on systems for energy-efficient buildings, cities, and transportation. 2019. (Year: 2019).*

Fierro, Gabe, et al. "Formalizing tag-based metadata with the brick ontology." Frontiers in Built Environment 6 (2020): 558034. (Year: 2020).*

* cited by examiner

REMOTE DISCOVERY OF BUILDING MANAGEMENT SYSTEM METADATA

TECHNICAL FIELD

The present disclosure relates generally to building management systems. More particularly, the present disclosure relates to cloud-based building management systems.

BACKGROUND

Building management systems may be used to control operations of a variety of different building management system components. In many cases, a building management system includes a centralized supervisory building management system controller that is used to control the overall building management system at the building site. Configuring and/or managing such systems from a remote site can be a challenge. What would be desirable is a cloud-based building management system that is easier to configure and/or manage from a remote location.

SUMMARY

The present disclosure relates generally to cloud-based building management systems. In one example, a method of remotely obtaining metadata from a building management system at a building site includes utilizing an intelligent gateway that is disposed at the building site and that is operably coupled with the building management system. A request for the intelligent gateway to obtain metadata from the building management system is received at the intelligent gateway, which applies the metadata request to individual components of the building management system. The intelligent gateway receives the requested metadata from the individual components of the building management system and translates the received metadata into a predetermined format for use by a remote server. The intelligent gateway communicates the translated metadata to the remote server.

In another example, a method of remotely configuring a building management system at a building site is disclosed. The building management system is operably coupled with an intelligent gateway disposed at the building site that is itself operably coupled with a network. An intelligent gateway interrogates one or more components of the building management system in order to obtain metadata from the one or more components of the building management system and translates the received metadata into a predetermined format for use by a remote server. The intelligent gateway communicates the translated metadata to the remote server. In some cases, the intelligent gateway receives configuration information for the building management system from the remote server, wherein the configuration information is based at least in part on the translated metadata communicated to the remote server.

In another example, a non-transitory, computer-readable storage medium has stored thereon executable instructions. When the executable instructions are executed by one or more processors of an intelligent gateway, the one or more processors of the intelligent gateway are caused to accept a request from a remote server for the intelligent gateway to obtain requested metadata from a building management system and to send one or more metadata requests to individual components of the building management system. The one or more processors of the intelligent gateway receive the requested metadata from the individual components of the building management system, translate the received metadata into a predetermined format for use by the remote server and communicate the translated metadata to the remote server.

The preceding summary is provided to facilitate an understanding of some of the innovative features unique to the present disclosure and is not intended to be a full description. A full appreciation of the disclosure can be gained by taking the entire specification, claims, figures, and abstract as a whole.

BRIEF DESCRIPTION OF THE FIGURES

The disclosure may be more completely understood in consideration of the following description of various examples in connection with the accompanying drawings, in which.

Figure 1:
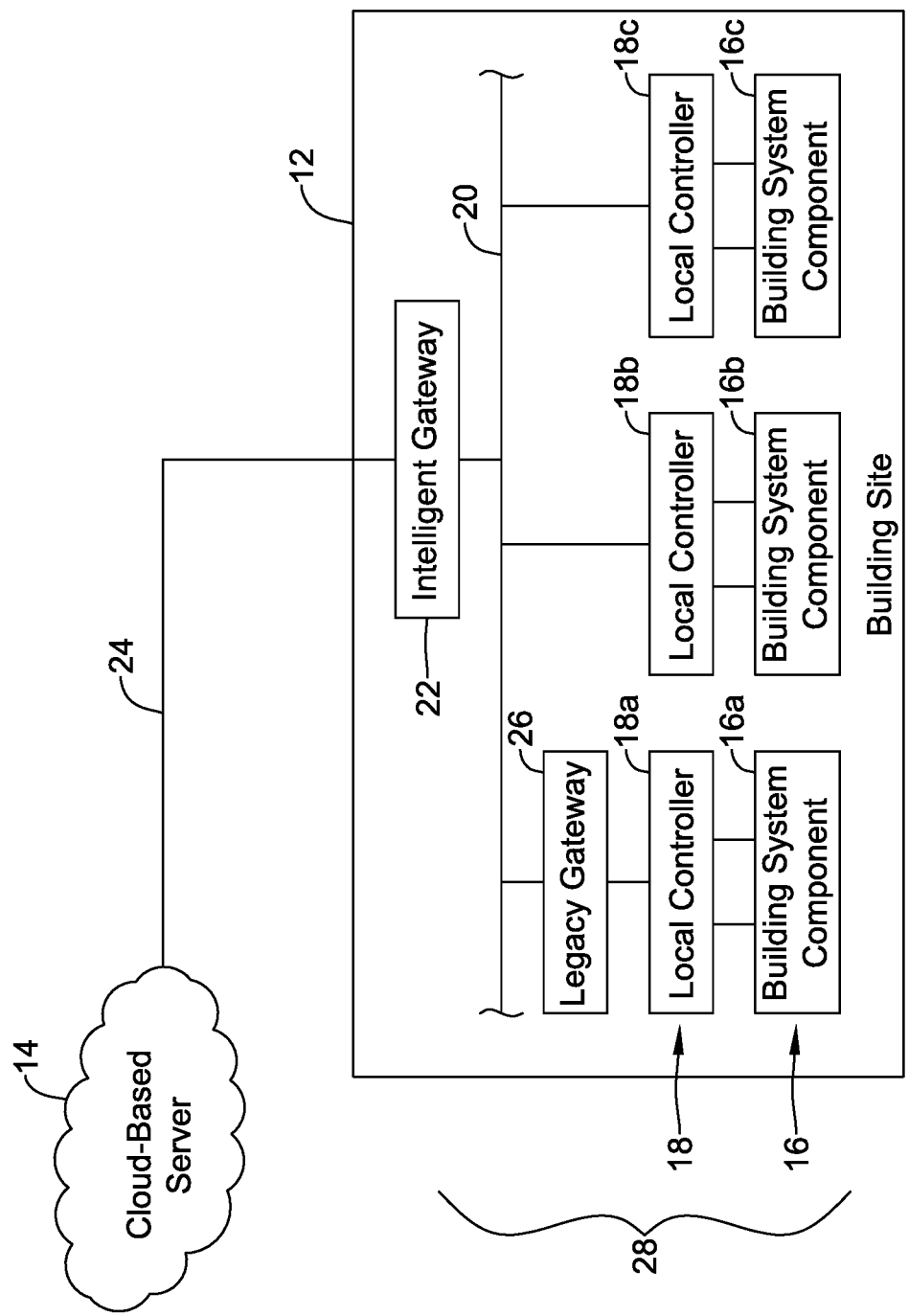
FIG. 1 is a schematic block diagram of an illustrative system.

While the disclosure is amenable to various modifications and alternative forms, specifics thereof have been shown by way of example in the drawings and will be described in detail. It should be understood, however, that the intention is not to limit the disclosure to the particular examples described. On the contrary, the intention is to cover all modifications, equivalents, and alternatives falling within the spirit and scope of the disclosure.

DESCRIPTION

The following description should be read with reference to the drawings, in which like elements in different drawings are numbered in like fashion. The drawings, which are not necessarily to scale, depict examples that are not intended to limit the scope of the disclosure. Although examples are illustrated for the various elements, those skilled in the art will recognize that many of the examples provided have suitable alternatives that may be utilized.

All numbers are herein assumed to be modified by the term "about", unless the content clearly dictates otherwise. The recitation of numerical ranges by endpoints includes all numbers subsumed within that range (e.g., 1 to 5 includes 1, 1.5, 2, 2.75, 3, 3.80, 4, and 5).

As used in this specification and the appended claims, the singular forms "a", "an", and "the" include the plural referents unless the content clearly dictates otherwise. As used in this specification and the appended claims, the term "or" is generally employed in its sense including "and/or" unless the content clearly dictates otherwise.

It is noted that references in the specification to "an embodiment", "some embodiments", "other embodiments", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is contemplated that the feature, structure, or characteristic is described in connection with an embodiment, it is contemplated that the feature, structure, or characteristic may be applied to other embodiments whether or not explicitly described unless clearly stated to the contrary.

FIG. 1 is a schematic block diagram of an illustrative building system 10. In its broadest terms, the illustrative building system 10 includes a building site 12 and a cloud-based server 14. The building site 12 may generally represent any building or portion of a building. In some cases, the building site 12 may be considered as representing a building or portion of a building that does not separately have a centralized local supervisory building management system. The building site 12 includes a number of building system components 16 that are individually labeled as 16a, 16b and 16c. While a total of three building system components 16 are shown, it will be appreciated that this is merely illustrative, as the building site 12 may include any number of building system components 16. The building system components 16 may represent individual components within a Heating, Air Conditioning and Ventilating (HVAC) system, such as heating sources, cooling sources, ventilation sources, VAV boxes, air dampers and the like, for example. Some of the building system components 16 may represent individual components within a security system, such as security sensors, control pads and the like. Some of the building system components 16 may represent individual components within a lighting system, such as individual lighting sources.

The building site 12 includes a number of local controllers 18 that are individually labeled as 18a, 18b, 18c. The local controllers 18 may be used, for example, to control operation of the building system components 16. While a total of three local controllers 18 are shown, it will be appreciated that this is merely illustrative, as the building site 12 may include any number of local controllers 18. While shown as having a one-to-one relationship between an individual building system component and a corresponding individual local controller 18, this is not necessarily true in all cases. For example, in some cases, a single local controller 18 could control operation of two or more different building system components 16.

In an HVAC system, for example, a particular local controller 18 could control operation of a VAV box that is represented by one of the building system components 16. The local controller 18 for that particular building system component 16 may control the relative damper position within the VAV box in order to achieve a desired air flow, or perhaps to achieve a desired temperature set point, within a corresponding portion of the building site 12. These are just examples.

Each of the local controllers 18 are operably coupled with a local network 20. The local network 20 may be a hardwired network, for example, or may in some cases be a wireless network. An intelligent gateway 22 may be operably coupled to the local network 20, and thus may be operably coupled to each of the local controllers 18 that are themselves operably coupled to the local network 20. In some cases, particularly if the building site 12 is relatively small, there may not be a local network 20. In such cases, each of the local controllers 18 may instead be directly coupled to the intelligent gateway 22 via a wired or wireless connection. In some cases, particularly if retrofitting an existing building site 12, one or more of the local controllers 18 may be operably coupled to a legacy controller or legacy gateway device 26. It will be appreciated that the building system components 16, the local controllers 18, the local network 20 and the legacy gateway device 26, if present, may collectively be referred to as a building management system 28 that is installed at the building site 12. In some cases, the local network 20 may operate in accordance with a network protocol, such as BACNET, MODBUS, LONTALK, ENOCEAN, ZIGBEE, X10 and/or any other suitable network protocol.

In the example shown, the intelligent gateway 22 functions as an intermediary between the local controllers 18 and the cloud-based server 14. For example, the intelligent gateway 22 may be configured to be able to interrogate any devices it finds operably coupled to the local network 20, and to obtain information such as metadata from those devices that helps the intelligent gateway 22 and/or the cloud-based server 14 identify those devices, including the building system components 16 and the local controllers 18. The intelligent gateway 22 may also be configured to receive local configuration information from the cloud-based server 14, and provide appropriate local configurations to each of the local controllers 18 such that each of the local controllers 18 are best able to control operation of the building system component(s) 16 for which they are responsible. In some cases, the intelligent gateway 22 may be configured to collect operational data regarding operation of the building system components 16 that is initially collected by the local controllers 18, and may be configured to provide the collected operational data to the cloud-based server 14. The intelligent gateway 22 may be operably coupled to the cloud-based server 14 via a network 24. The network 24 may represent a single network, or a compilation of two or more distinct networks. The network 24 may include the Internet.

The cloud-based server 14, which may represent a single computer server or a collection of computer servers, may function as a centralized building management system controller for the building management system. In some cases, the centralized building management system controller implemented by the cloud-based server 14 may be considered as a replacement for an onsite centralized building management system controller. Such a centralized building management system controller may provide some or all of the functionality of an onsite centralized building management controller without requiring all of the hardware that would typically be associated with an onsite centralized building management system controller, such as a server, desktop or other computer hardware running centralized building management system software.

Figure 2:
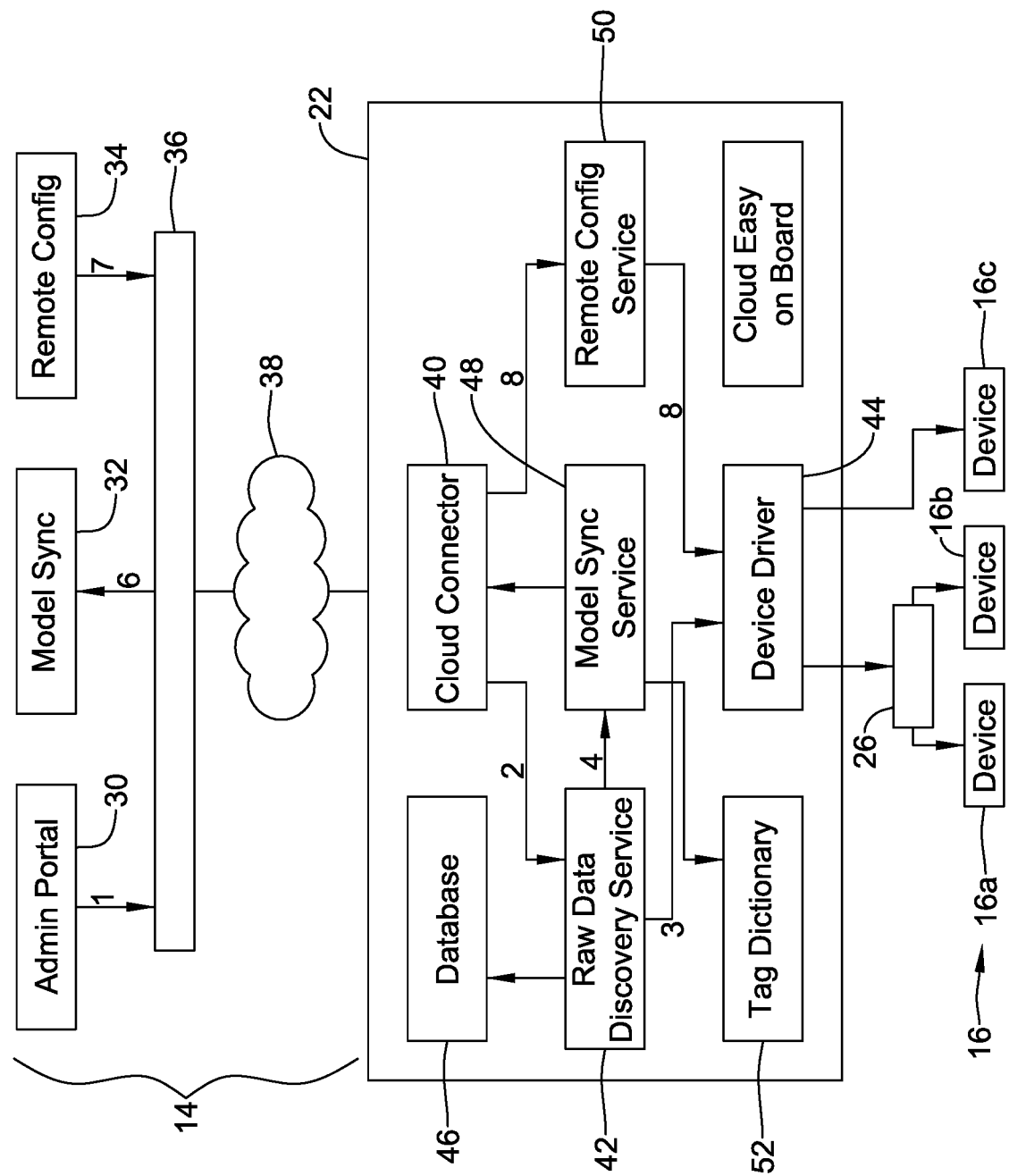
FIG. 2 is a schematic block diagram showing features of the illustrative system of FIG. 1.

FIG. 2 provides additional details regarding the functionality provided by both the cloud-based server 14 and the intelligent gateway 22. As illustrated, the cloud-based server 14 includes an Admin Portal 30, a Model Sync Block 32 and a Remote Config Block 34, each of which communicate with a server 36 and/or with a cloud-based server 38. In some cases, the server 36 and the cloud-based server 38 may both be considered to be part of a single cloud-based server, and may individually or in combination also represent all or part of the network 24 shown in FIG. 1. The Admin Portal 30 allows a user to gain access to the intelligent gateway 22 such that the user can solicit collection of metadata from individual components of the building management system 28. It can be seen that there is a numeral "1" shown within the arrow exiting the Admin Portal 30.

Upon using the Admin Portal 30, the user may gain access to a Cloud Connector block 40 shown within the intelligent gateway 22. The Cloud Connector block 40 may include a wired or wireless transceiver, for example, in order to transmit data through the Cloud Connector block 40. The data request flows (as indicated by the numeral "2" in the arrow) to the Raw Data Discovery Services Block 42, which applies the data request to a Device Driver block 44, as indicated by the numeral "3" in the arrow. If the building system components 16 are BACNET devices, the Device Driver block 44 may itself be a BACNET Driver, for example.

The requested metadata is provided back up to the intelligent gateway 22, and is stored within a database 46 prior to the data flowing to a Model Sync Block 48, where the metadata is translated into an appropriate predetermined format to be sent back up to the cloud-based server 14. In some cases, metadata that is received from a device that operates in accordance with a protocol such as BACnet, OPCUA (OPC Unified Architecture), SNMP (Simple Network Management Protocol) and the like include corresponding drivers that operate in Niagara. When point data is fetched into Niagara, for example, it will be translated into a Niagara object model. For BACnet, for example, the object model or hierarchy is BacnetNetwork>BacnetDevices>BacnetPoints. Using a mechanism known as tagging, the relationships are established for each level of hierarch. Again using our example, BacknetNetwork–hasChildren>Devices–hasChildren>points, where hasChildren is a tag. The Model Sync Block 48 may reference a TAG dictionary 52 during the metadata translation. The TAG dictionary 52 may provide additional information for tagging the received metadata with useful information such as, and depending on the metadata received, a data type, a unit of measurement, a source and/or a destination of the metadata, a point name associated with the metadata, and/or any other suitable information.

As indicated by the numeral "5" within the arrow, the translated metadata flows back through the Cloud Connector block 40, and up to the Model Sync Block 32 within the cloud-based server 14. The Model Sync Block 32 within the cloud-based server 14 may allow the remote or cloud-based server 14 to, for example, periodically update a cloud-based model of the building management system. The cloud-based model may be used to, for example, control, diagnose and/or otherwise operate the building management system. In some cases, building a model includes running an iterator to get all of the components and devices, along with the relationships therebetween. For each device, points are obtained. This model data is pushed to the Model Sync Block 32. In some cases, a context discovery machine learning algorithm may be used to segregate the points and group into different equipment.

In the example shown, the Remote Config Block 34 may receive configuration settings from a user. In some cases, the Remote Config Block 34 may use at least some of the requested metadata from the intelligent gateway 22 to help determine and/or recommend appropriate configuration settings for the devices within the building management system 28. In some cases, the Remote Config Block 34 enables the remote or cloud-based server 14 to configure at least some of the individual components of the building management system 28 and to download configuration data to at least some of the individual components of the building management system 28 via the intelligent gateway 22. These configuration settings are sent to the intelligent gateway 22 and to a Remote Config Block 50 within the intelligent gateway 22. The Remote Config Block 50 sends the configuration settings to the Device Driver block 44, which sends the configuration settings to the individual building system components 16.

Figure 3:
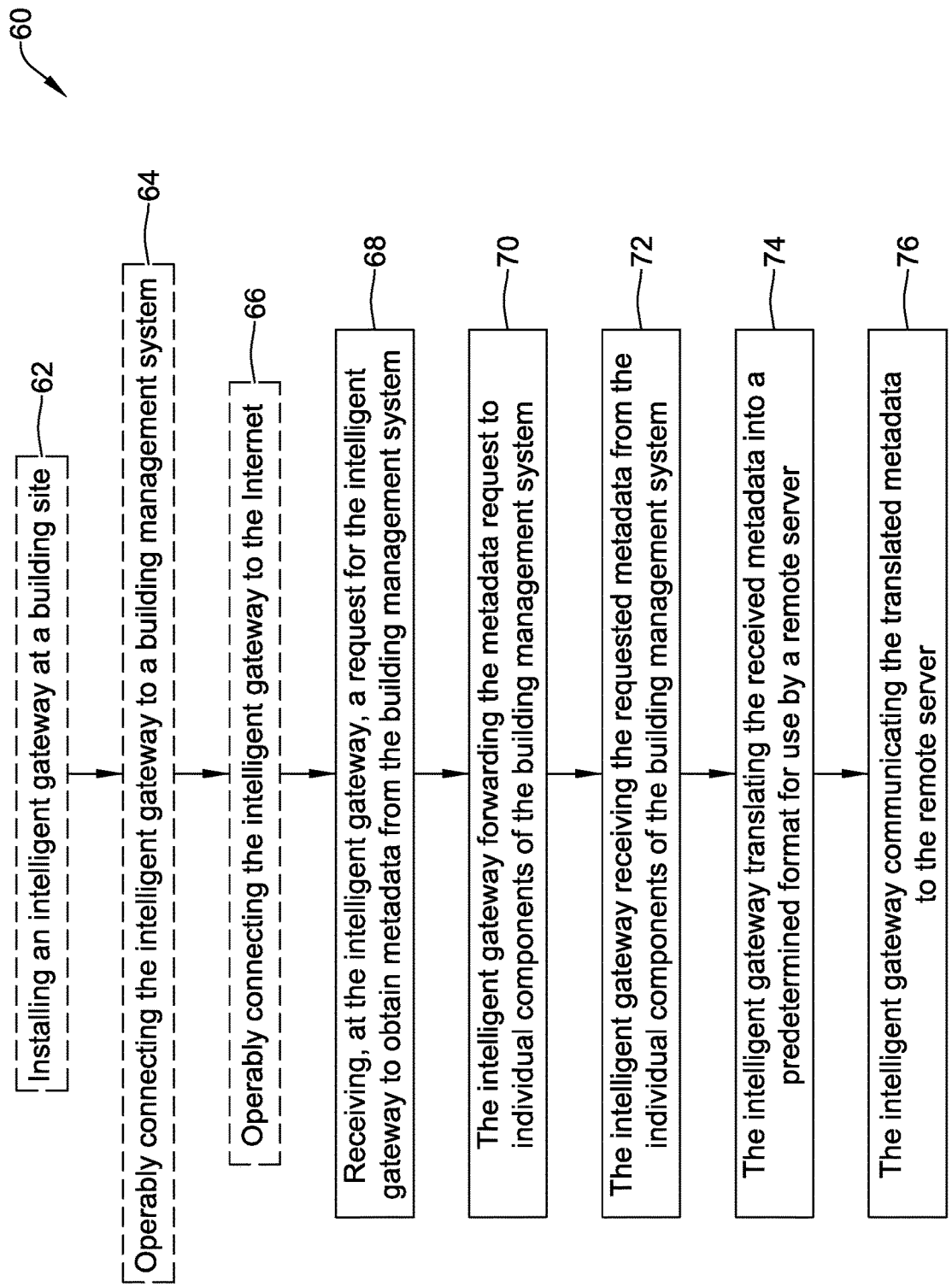
FIG. 3 is a flow diagram showing an illustrative method that may be carried out using the illustrative system of FIG. 1.

FIG. 3 provides a flow diagram showing an illustrative method 60 of remotely obtaining metadata from a building management system (such as the building management system 28) at a building site (such as the building site 12). The building management system is operably coupled with an intelligent gateway (such as the intelligent gateway 22) disposed at the building site that is itself operably coupled with a network (such as the local network 20). In some cases, an intelligent gateway 22 is first installed at the building site as indicated at block 62, operably coupled to the building management system as optionally indicated at block 64, and operably coupled to the Internet as indicated at block 66, during an original commissioning of the building site. Once this is accomplished, much or all of the rest of the commissioning and/or operation of the building management system may be accomplished from a cloud-based server.

Once setup, a request for the intelligent gateway to obtain metadata from the building management system may be received at the intelligent gateway as indicated at block 68. This request may, for example, be generated by the remote server, or in some cases initiated at the Admin Portal 30 shown in FIG. 2. The intelligent gateway applies the metadata request to individual components of the building management system, as indicated at block 70, and receives the requested metadata from the individual components of the building management system as indicated at block 72. The intelligent gateway translates the received metadata into a predetermined format for use by a remote server, as indicated at block 74, and communicates the translated metadata to the remote server, as indicated at block 76. In translating the metadata, the intelligent gateway 22 may add tags and/or relationships to the received metadata. The remote or cloud-based server 14 may be configured to use the translated metadata to, for example, generate a cloud-based model of the building management system. In some cases, the remote or cloud-based server 14 may be configured to update the cloud-based model of the building management system over time using updated metadata.

In some cases, the intelligent gateway 22 may be configured to, upon receiving the request for metadata, interrogate individual components of the building management system 28 to obtain the requested metadata. These requested may be in a format the is compatible with the individual components of the building management system 28. For example, the individual components of the building management system 28 may be connected to the intelligent gateway 22 over a network having a network protocol, such as a BACNET network, and the metadata requests may be made using commands that are compatible with the network protocol, such as BACNET commands. The intelligent gateway 22 stores the received metadata in a database 46 prior to translating the metadata and communicating the translated metadata to the remote server 14. The intelligent gateway 22 may be configured to communicate directly with at least some of the individual components of the building management system 28. In some cases, the intelligent gateway 22 may be configured to communicate with at least some of the individual components of the building management system 28 by way of a legacy gateway device 26 that is operably coupled between the intelligent gateway 22 and the at least some of the individual components of the building management system 28.

Figure 4:
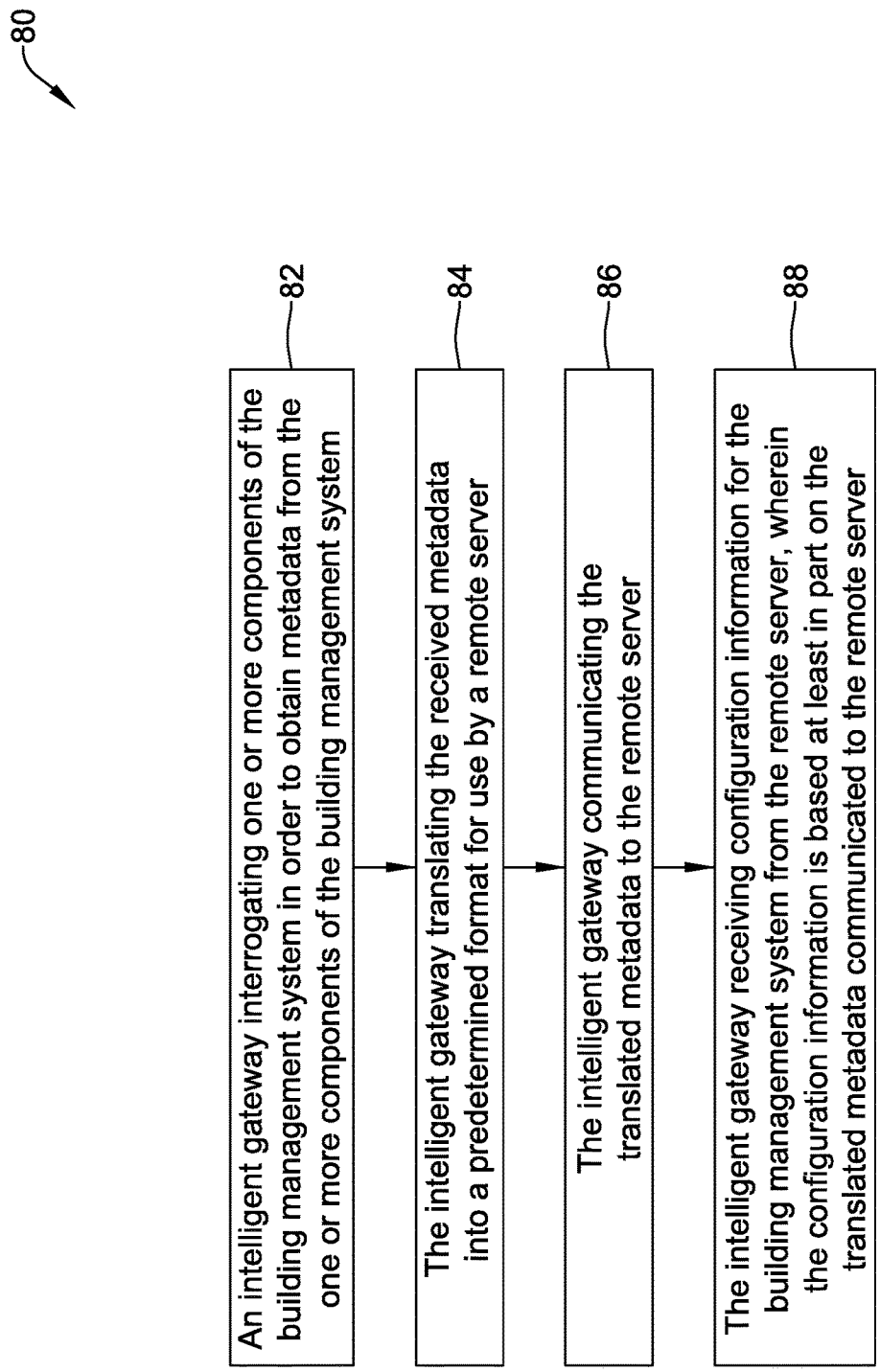
FIG. 4 is a flow diagram showing an illustrative method that may be carried out using the illustrative system of FIG. 1.

FIG. 4 is a flow diagram showing an illustrative method 80 of remotely configuring a building management system at a building site. The building management system may be operably coupled with an intelligent gateway disposed at the building site that is itself operably coupled with a network. The intelligent gateway interrogates one or more components of the building management system in order to obtain metadata from the one or more components of the building management system, as indicated at block 82. The intelligent gateway then translates the received metadata into a predetermined format for use by a remote server, as indicated at block 84. The intelligent gateway communicates the translated metadata to the remote server, as indicated at block 86.

Figure 5:
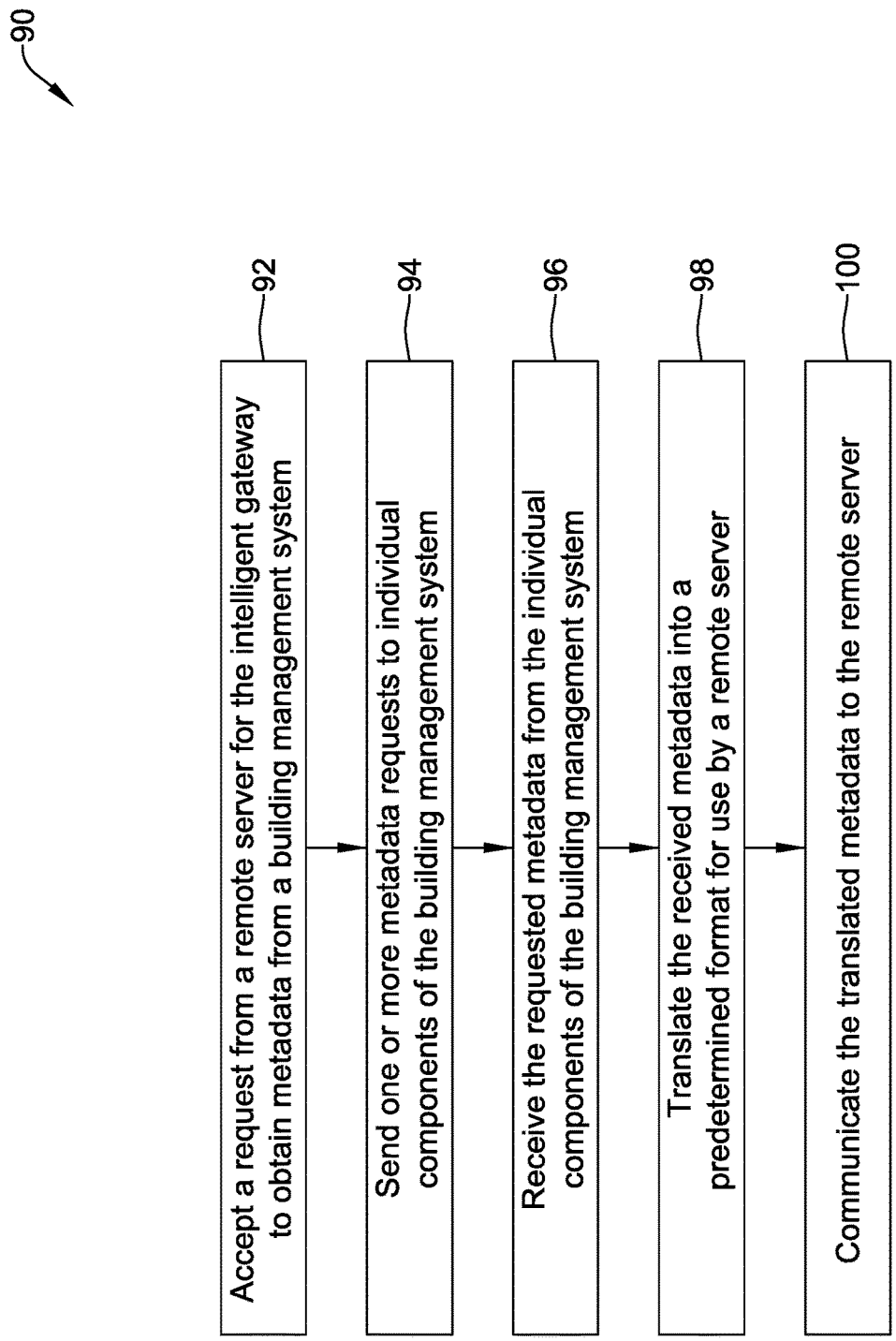
FIG. 5 is a flow diagram showing an illustrative method that may be carried out using the illustrative system of FIG. 1.

The intelligent gateway may also receive configuration information for the building management system from the remote server, wherein the configuration information is based or derived from at least in part on the translated metadata communicated to the remote server, as indicated at block 88. The configuration information received by the intelligent gateway may, for example, include operational instructions for the intelligent gateway and/or operational instructions for one or more local controllers that control operation of the one or more components of the building management system FIG. 5 is a flow diagram showing an illustrative method 90 of obtaining metadata. An intelligent gateway accepts a request from a remote server for the intelligent gateway to obtain requested metadata from a building management system, as indicated at block 92. One or more metadata requests are sent to individual components of the building management system, as indicated at block 94. The requested metadata is received from the individual components of the building management system, as indicated at block 96, and is translated into a predetermined format for use by the remote server, as indicated at block 98. The translated metadata is communicated to the remote server, as indicated at block 100. In some cases, the intelligent gateway communicates directly with at least some of the individual components of the building management system. The intelligent gateway may, for example, communicate with at least some of the individual components of the building management system by way of a legacy gateway device that is operably coupled between the intelligent gateway and the at least some of the individual components of the building management system.

While the above disclosure is described with respect to a building management system, it is contemplated that the disclosure may be applied to other applications, such as industrial processes control applications, aerospace applications and/or any other suitable application. For example in an industrial process control application, the system may be similar to that shown in FIG. 1 except the building system components may be replaced with industrial process control components. An intelligent gateway, located in the industrial facility and operatively connected to the industrial process control components, may communicate with a cloud-based server in the manner described. Likewise, in an aerospace application, the system may be similar to that shown in FIG. 1 except the building system components may be replaced with airplane control components. An intelligent gateway, located in an airplane and operatively connected to the airplane control components, may communicate with a cloud-based server in the manner described.

Having thus described several illustrative embodiments of the present disclosure, those of skill in the art will readily appreciate that yet other embodiments may be made and used within the scope of the claims hereto attached. It will be understood, however, that this disclosure is, in many respects, only illustrative. Changes may be made in details, particularly in matters of shape, size, arrangement of parts, and exclusion and order of steps, without exceeding the scope of the disclosure. The disclosure's scope is, of course, defined in the language in which the appended claims are expressed.

What is claimed is:

1. A method of remotely obtaining metadata from a building management system at a building site, the building management system including a plurality of individual components operably coupled with an intelligent gateway disposed at the building site that is itself operably coupled to a remote server via a network, the method comprising:
   receiving, from the remote server at the intelligent gateway, a request for the intelligent gateway to obtain metadata from the building management system;
   in response to receiving the request, transmitting, at the intelligent gateway, a metadata request to a individual component of the plurality of individual components through a device driver corresponding to the individual component, wherein the device driver facilitates communication with the individual component;
   in response to transmitting the metadata request to the individual component of the building management system, receiving, at the intelligent gateway, metadata from the individual component of the building management system;
   translating the received metadata into a predetermined format based on communication protocol associated with the individual component, wherein translating further comprises tagging the received metadata using a tag dictionary with at least a data type, and a unit of measurement, wherein the predetermined format is defined to facilitate building and/or updating a cloud-based model that is representative of the building management system and used in subsequently controlling, diagnosing and/or otherwise operating the building management system; and
   the intelligent gateway communicating the translated metadata to the remote server.

2. The method of claim 1, wherein the metadata request is generated by the remote server.

3. The method of claim 1, wherein the remote server is configured to use the translated metadata to generate the cloud-based model that is representative of the building management system.

4. The method of claim 3, wherein the remote server is configured to periodically update the cloud-based model that is representative of the building management system.

5. The method of claim 1, wherein the intelligent gateway is configured to store the received metadata in a database hosted by the intelligent gateway prior to translating the metadata and communicating the translated metadata to the remote server.

6. The method of claim 1, wherein the intelligent gateway is configured to communicate directly with at least some of the individual components of the building management system.

7. The method of claim 1, wherein the intelligent gateway is configured to communicate with at least some of the individual components of the building management system by way of a legacy gateway device that is operably coupled between the intelligent gateway and the at least some of the individual components of the building management system.

8. The method of claim 1, wherein the remote server provides an administrative portal that allows a user to initiate the request for metadata.

9. The method of claim 4, wherein the remote server provides a model synchronization module that enables the remote server to periodically update the cloud-based model that is representative of the building management system.

10. The method of claim 1, wherein the remote server provides a remote configuration module that enables the remote server to configure at least some of the individual components of the building management system with configuration settings that configure the corresponding individual components for subsequent use, and to download the configuration settings to the corresponding individual components of the building management system via the intelligent gateway.

11. The method of claim 1, further comprising:
installing the intelligent gateway at the building site;
operably connecting the intelligent gateway to the building management system;
operably connecting the intelligent gateway to the Internet; and
commissioning the building management system from the remote server.

12. The method of claim 1, wherein the intelligent gateway translating the received metadata comprises adding relationships to the received metadata, wherein the relationship corresponds to a hierarchal representation of the individual components within the building management system.

13. A method of initially commissioning a building management system at a building site from a remote server, the building management system operably coupled with an intelligent gateway disposed at the building site, the intelligent gateway operably coupled with a network, the method comprising:
receiving, from the remote server at the intelligent gateway, a request for the intelligent gateway to obtain metadata from the building management system;
in response to receiving the request, interrogating, by the intelligent gateway, a components of the building management system to obtain metadata through a device driver associated with the component, wherein the metadata includes information indicative of whether the component is currently part of the building management system;
translating the received metadata into a predetermined format based on communication protocol associated with the component, wherein translating further comprises tagging the received metadata using a tag dictionary with at least a data type, and a unit of measurement;
communicating the translated metadata to the remote server; and
receiving configuration settings from the remote server for initially commissioning the building management system, wherein the configuration settings are based at least in part on the translated metadata communicated to the remote server.

14. The method of claim 13, wherein the configuration settings received by the intelligent gateway includes operational instructions for the intelligent gateway that control operation of the intelligent gateway during subsequent operation.

15. The method of claim 13, wherein the configuration settings received by the intelligent gateway includes operational instructions for one or more local controllers that control operation of the component of the building management system during subsequent operation.

16. A non-transitory, computer-readable storage medium having stored thereon executable instructions that, when executed by one or more processors of an intelligent gateway, cause the one or more processors of the intelligent gateway to:
receive a request from a remote server—for the intelligent gateway to obtain metadata from the building management system;
transmit metadata request to an individual component of the building management system through a device driver corresponding to the individual component, wherein the metadata includes information indicative of whether the individual component is currently part of the building management system;
receive the requested metadata from the individual components of the building management system;
translate the received metadata into a predetermined format based on communication protocol associated with the component, wherein translating further comprises tagging the received metadata using a tag dictionary with at least a data type, and a unit of measurement
communicate the translated metadata to the remote server; and
receive configuration settings from the remote server for configuring the building management system, wherein the configuration settings are based at least in part on the representation of the metadata communicated to the remote server.

17. The non-transitory, computer-readable storage medium of claim 16, wherein execution of the executable instructions cause the intelligent gateway to communicate directly with the individual component of the building management system.

18. The non-transitory, computer-readable storage medium of claim 16, wherein execution of the executable instructions cause the intelligent gateway to communicate with at least some of the individual components of the building management system through a legacy gateway device that is operably coupled between the intelligent gateway and the individual component of the building management system.

* * * * *